United States Patent
Langford et al.

(10) Patent No.: US 12,246,540 B2
(45) Date of Patent: Mar. 11, 2025

(54) PROFILE GOVERNING SERVICING MAINTENANCE OF FLUIDIC PRINTHEAD NOZZLES

(71) Applicant: Hewlett-Packard Development Company, L.P., Spring, TX (US)

(72) Inventors: Jeffrey D Langford, Corvallis, OR (US); Dean H Ouchida, Vancouver, WA (US); Kris M English, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 155 days.

(21) Appl. No.: 18/035,863

(22) PCT Filed: Nov. 20, 2020

(86) PCT No.: PCT/US2020/061423
§ 371 (c)(1),
(2) Date: May 8, 2023

(87) PCT Pub. No.: WO2022/108591
PCT Pub. Date: May 27, 2022

(65) Prior Publication Data
US 2023/0405998 A1    Dec. 21, 2023

(51) Int. Cl.
*B41J 2/175*     (2006.01)
*B41J 2/165*     (2006.01)
*B41J 2/17*      (2006.01)

(52) U.S. Cl.
CPC ....... *B41J 2/17566* (2013.01); *B41J 2/16526* (2013.01); *B41J 2/16535* (2013.01); *B41J 2/1707* (2013.01); *B41J 2002/16573* (2013.01); *B41J 2002/17569* (2013.01)

(58) Field of Classification Search
CPC .......... B41J 2/17566; B41J 2/16526; B41J 2/16535; B41J 2/1707; B41J 2002/16573; B41J 2002/17569
See application file for complete search history.

(56) References Cited

U.S. PATENT DOCUMENTS

| | | |
|---|---|---|
| 7,212,300 B2 | 5/2007 | Comer et al. |
| 7,243,270 B2 | 7/2007 | Taniguchi et al. |
| 7,431,424 B2 | 10/2008 | Silverbrook et al. |
| 7,452,053 B2 | 11/2008 | Valles et al. |
| 7,992,960 B2 * | 8/2011 | Brister ............ B41J 2/16526 347/23 |
| 9,524,132 B2 | 12/2016 | Weaver et al. |

(Continued)

FOREIGN PATENT DOCUMENTS

| | | |
|---|---|---|
| CN | 106385440 A | 2/2017 |
| JP | 2009-262353 A | 11/2009 |

(Continued)

*Primary Examiner* — Sharon Polk
(74) *Attorney, Agent, or Firm* — Michael Dryja

(57) ABSTRACT

Fluidic usage data over time is received from a printing device. A profile governing servicing maintenance of fluidic printhead nozzles of the printing device is determined based on the received fluidic usage data over time. The profile is transmitted to the printing device. The printing device performs spit-wipe-prime operations on the fluidic printhead nozzles according to the profile.

15 Claims, 4 Drawing Sheets

(56) References Cited

U.S. PATENT DOCUMENTS

| | | | |
|---|---|---|---|
| 2009/0073219 A1* | 3/2009 | Curcio | B41J 2/16535 |
| | | | 347/33 |
| 2012/0320126 A1 | 12/2012 | Martin et al. | |
| 2018/0029372 A1 | 2/2018 | Sahara et al. | |
| 2020/0101717 A1 | 4/2020 | Nishikawa | |

FOREIGN PATENT DOCUMENTS

| JP | 2018-012344 A | | 1/2018 | | |
|---|---|---|---|---|---|
| JP | 2022042269 A | * | 3/2022 | ............ | B41J 2/0451 |
| WO | WO-2018174886 A1 | * | 9/2018 | .......... | B41J 2/04573 |
| WO | 2019/222430 A1 | | 11/2019 | | |

* cited by examiner

PROFILE GOVERNING SERVICING MAINTENANCE OF FLUIDIC PRINTHEAD NOZZLES

BACKGROUND

Printing devices, including standalone printers and all-in-one (AIO) printing devices which combine printing functionality with other functionality like scanning and copying, can use a variety of different printing techniques. One type of printing technology is inkjet printing technology, which is more generally a type of fluid-ejection technology. A device, such as a printhead (i.e., a printhead die) or a printing device having such a printhead, includes a number of fluid-ejection elements with respective nozzles. Firing a fluid-ejection element causes the element to eject fluid, such as a drop thereof, from its nozzle.

DETAILED DESCRIPTION

Figure 1:
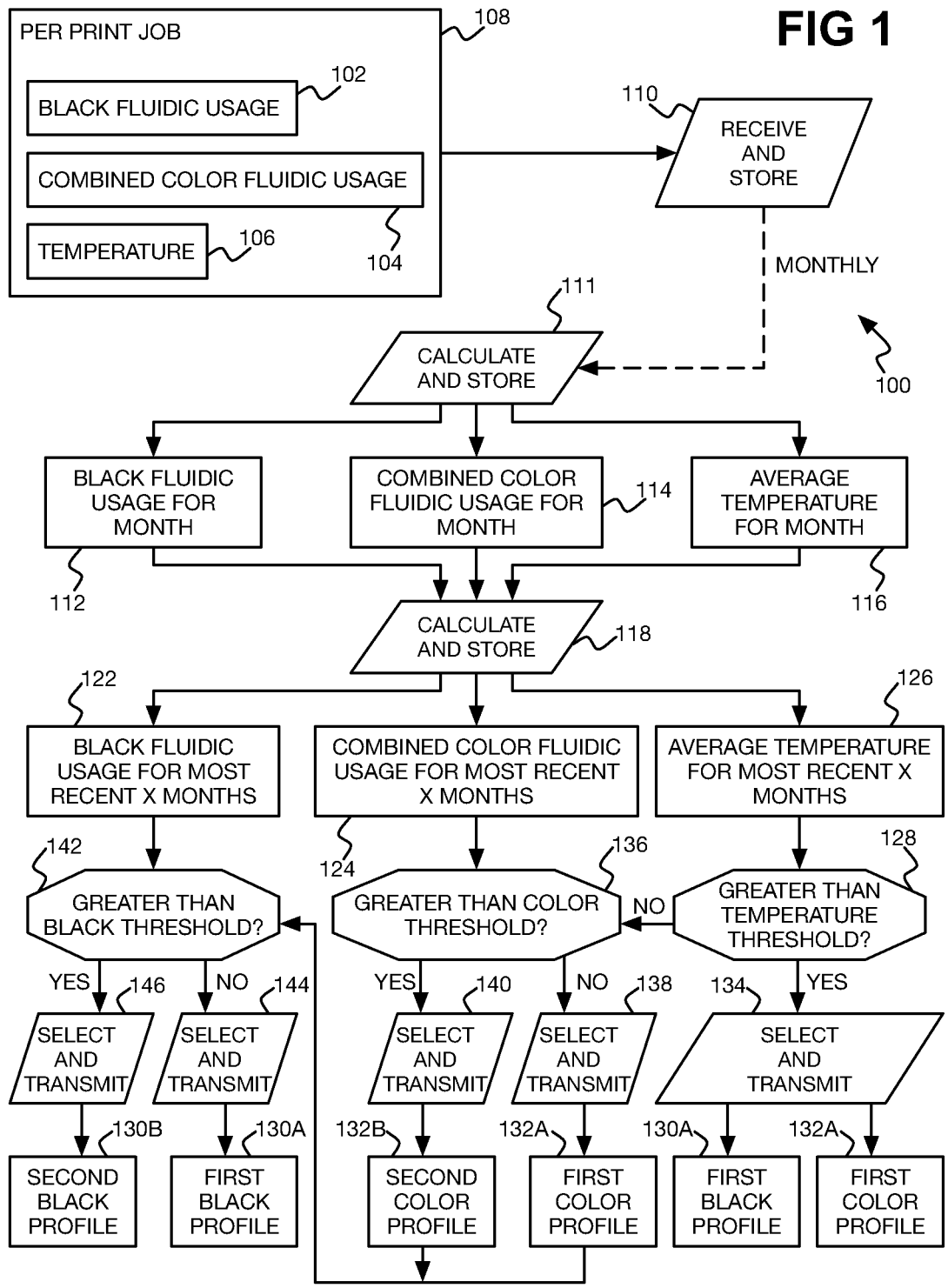
FIG. 1 is a diagram of an example process for selecting a preselected profile governing servicing maintenance of fluidic printhead nozzles of a printing device.

As noted in the background, printing devices can include eject fluid like ink from fluidic printhead nozzles. For example, a printing device can eject ink onto media like paper advancing through the device to form a printed image on the media. A printing device periodically performs servicing maintenance on the nozzles to ensure that fluid can be properly ejected from the nozzles and thus to maintain print quality, such as the image quality of printed images. For example, if residual ink or other fluid dries on the nozzles, subsequent fluid ejection from the nozzles may be impaired or prevented, which can negatively affect print quality.

Servicing maintenance of a fluid-ejection printhead of a printing device may occur at a service station to which the printing device moves a carriage including the printhead. A service station may be located at one or both ends of the print zone in which the printhead ejects fluid onto media advancing through the device to form a printed image on the media. While the printhead is at the service station, the printing device may perform spit-wipe-prime operations, which include spit operations, wipe operations, and prime operations, on the fluidic printhead nozzles.

A spit operation is the forcible ejection of fluid through a nozzle by firing a corresponding fluid-ejection element to dislodge any residual dried fluid on the nozzle, while the printhead is at the service station. The ejection of fluid during a spit operation does not, in other words, occur to form an image on media during printing, and is not directed towards media. Rather, the fluid ejected during a spit operation is directed to a waste container and is not reused for subsequent image formation. The amount of fluid ejected during a spit operation may indeed be greater than the amount of fluid ejected to form a printed pixel during printing.

A wipe operation is the wiping of the fluidic printhead nozzles in a physical interference manner relative to a wiper or a wiping material. For example, the printing device may move a wiper back and forth against the nozzles while the fluid-ejection printhead is at the service station. As another example, the printing device may instead or also move the printhead back and forth against a wiper or a wiping material while the printhead is at the service station. The wiping operation also may dislodge any residual dried fluid on the nozzle.

A prime operation is the forcible movement of fluid through a nozzle without firing a corresponding fluid-ejection element, to similarly dislodge any residual dried fluid on the nozzle while the printhead is at the service station. For instance, positive or negative pressure may be externally applied to the nozzle to clear the nozzle. As one example, a suctioning operation may be performed on the nozzle to draw fluid from a chamber of a corresponding fluid-ejection element through the nozzle.

A printing device may perform spit-wipe-prime operations on its fluidic printhead nozzles in accordance with a profile that governs the servicing maintenance of the nozzles. The profile dictates when servicing maintenance of the nozzles is to occur, the sequence of the spit-wipe-prime operations that are to occur when servicing maintenance is performed, and the duration of each spit-wipe-prime operation in the sequence that is to be performed. For instance, a profile may dictate that nozzle servicing maintenance be performed immediately prior to printing a print job to form a printed image on media, during the print job, immediately after printing the print job, or while the printing device is at rest and is not actively printing a print job, about to print a print job, or has just concluded printing a print job.

As an example, a servicing maintenance profile may indicate that, when a print job is to be printed, no spit-wipe-prime operations be performed if a previous print job was recently printed. The profile may indicate that, when a print job is to be printed, a specified sequence of spit-wipe-prime operations is to be performed if a previous print job was printed more than a threshold length of time ago, and a more aggressive sequence be performed if the previous print job was printed more than an even longer threshold length of time ago. The more aggressive sequence of spit-wipe-prime operations may specify more operations than the less aggressive sequence, and/or each operation in the more aggressive sequence may itself be more aggressive. For instance, a spit operation that forcibly ejects more fluid (i.e., the operation is performed for a longer duration) than another spit operation is the more aggressive operation.

The profile that governs the servicing maintenance of fluidic printhead nozzles within a printing device is usually hardcoded into the printing device at time of manufacture. The manufacturer may conduct laboratory and field tests to determine an optimal servicing maintenance profile that maintains print quality for the vast majority of expected usage scenarios of printing devices of the same type. The intention may be to balance the frequency at which a user has to manually initiate performance of spit-wipe-prime operations and the amount of fluid and time wasted during potentially unnecessary profile-initiated operations. That is, if the nozzles are not plugged, then profile-initiated maintenance results in wasted fluid and time, whereas if the nozzles are plugged but the profile does not initiate servicing maintenance, then the user may have to manually initiate maintenance after encountering impaired print quality.

Techniques described herein ameliorate this issue associated with hardcoded servicing maintenance profiles for fluidic printhead nozzles of a printing device. Fluidic usage data over time, as well as potentially other data, is received from a printing device. A profile governing the servicing maintenance of the fluidic printhead nozzles of the printing device is determined based on the received fluidic usage data over time, as well as potentially based on other received data. The determined profile is transmitted to the printing device, which subsequently performs spit-wipe-prime operations on the fluidic printhead nozzles in accordance with the received profile.

FIG. 1 shows an example process 100 for selecting a preselected profile governing servicing maintenance of fluidic printhead nozzles of a printing device. The process 100 is performed by a computing device, such as a cloud-computing server, or another type of computing device. The computing device is communicatively connected to the printing device, such as over a network like the Internet. The process 100 may be implemented as program code stored on a non-transitory computer-readable data storage medium and executable by the computing device.

The printing device may be a standalone inkjet printer, an all-in-one (AIO) inkjet-printing device, or another type of fluid-ejection printing device. The described printing device in the example of FIG. 1 includes two types of fluidic printhead nozzles: black nozzles that eject black ink, and color nozzles that eject color ink. As to the latter, for example, the color nozzles may include cyan, magenta, and yellow nozzles that respectively eject cyan, magenta, and yellow ink. The black nozzles and the color nozzles may be part of the same or different printheads of the printing device. The black nozzles as a whole are more generally considered single color nozzles in that they include nozzles that eject the same color of ink or other fluid, and the color nozzles as a whole are more generally considered multiple color nozzles in that they include nozzles that eject ink or other fluid of different colors.

Black (e.g., single color) fluidic usage data 102, combined color (e.g., multiple color) fluidic usage data 104, and temperature data 106 may be collected per print job 108 at the printing device and transmitted to the computing device, which receives and stores this data (110). The black fluidic usage data 102 is a direct or indirect measure of the amount of black ink that the printing device used when printing a print job 108. The color fluidic usage data 104 is a direct or indirect measure of the combined amount of color ink (e.g., cyan, magenta, and yellow ink) that the printing device used when printing the print job 108. The temperature data 106 indicates ambient temperature of the printing device or the temperature of or at the printhead(s) including the fluidic printhead nozzles of the device at the time of printing the print job 108.

The fluidic usage data 102 and 104 may be a direct measure of the amount of ink or other fluid in that the data 102 and 104 may each indicate an actual volume of such fluid. The fluidic usage data 102 and 104 may instead be an indirect measure of the amount of ink or other fluid in that the data 102 and 104 may each indicate the number of corresponding pixels (e.g., black or color) that have been printed, which correlates to the amount of ink and thus the fluidic usage. In the example of FIG. 1, the fluidic usage data 102 and 104 are provided for each print job 108 that the printing device prints, and may be provided as or after each print job 108 is printed, or periodically for a number of print jobs 108 or in accordance with a schedule.

The fluidic usage data 102 and 104 and the temperature data 106 are more generally considered to be provided by the printing device over time. That is, providing the fluidic usage data 102 and 104 and the temperature data 106 for each print job 108 is the providing of such data 102, 104, and 106 over time. However, instead of the fluidic usage data 102 and 104 and the temperature data 106 provided on a per-print job 108 basis, cumulative data 102, 104, and 106 may be provided for successive time periods, such as hourly, daily, weekly, and so on, which also constitutes the providing of such data 102, 104, and 106 over time.

The computing device on a monthly or other temporal basis calculates and stores (111) the following based on the fluidic usage data 102 and 104 and temperature data 106 received and stored during the preceding month. The computing device calculates and stores (111) the total black (e.g., single color) fluidic usage 112 for the month by adding the black fluidic usage data 102 received and stored for print jobs 108 during the month. The computing device similarly calculates and stores (111) the combined color (e.g., multiple color) fluidic usage 114 for the month by adding the combined color fluidic usage 104 received and stored for print jobs 108 during the month. The computing device also calculates and stores (111) the average temperature 116 for the month based on the temperature data 106 received and stored for print jobs 108 during the month.

For example, the average temperature 116 for the month may be a per-print job temperature, which the computing device calculates by simply averaging the temperature data 106 for each print job 108 for the month. As another example, the average temperature 116 for the month may be a per-page temperature, which the computing device calculates by averaging the temperature data 106 for each print job 108 for the month as weighted by the number of pages of the print job 108. As a third example, the average temperature 116 for the month may be a per-fluid amount temperature, which the computing device calculates by averaging the temperature data 106 for each print job 108 for the month as weighted by the sum of the black fluidic usage data 102 and the combined color fluidic usage data 104 of the print job 108.

The computing device then calculates and stores (118) the following after having calculated and stored the total black fluidic usage 112, the total combined color fluidic usage 114, and the average temperature 116 for the preceding month. The computing device calculates and stores (118) the black (e.g., single color) fluidic usage 122 for the most recent three (or other number of) months. For example, the computing device may calculate and store the total black fluidic usage 122 for the most recent three months by adding the black fluidic usage 112 for each of the preceding three months. As another example, the computing device may calculate and store the average black fluidic usage 122 for the most recent three months by averaging the black fluidic usage 112 for each of the preceding three months.

The computing device similarly calculates and stores (118) the combined color (e.g., multiple color) fluidic usage 124 for the most recent three (or other number of) months. The computing device may calculate and store the total or the average combined color fluidic usage 124. The computing device also calculates and stores (118) the average temperature 126 for the most recent three (or other number of) months. For example, the computing device may calculate an average of the average temperature 116 for each of the preceding three months. In calculating this average, the computing device may not weight the average temperature 116 for each month, or the computing device may weight the average temperature 116 for each month by the number of print job pages printed during the month or by the sum of the black fluidic usage 112 and the combined color fluidic usage 114 during the month.

In the example of FIG. 1, if the average temperature 126 for the most recent three (or other number of) months is greater than a temperature threshold (128), then a first black profile 130A and a first color profile 132A are selected by the computing device and transmitted to the printing device (134). The first black profile 130A governs servicing maintenance of the black fluidic printhead nozzles of the printing device, whereas the first color profile 132A governs servicing maintenance of the color fluidic printhead nozzles (e.g., the cyan, magenta, and yellow nozzles) of the printing device. The printing device thus performs spit-wipe-prime operations on the black and color nozzles according to the first black and color profiles 130A and 132A, respectively.

The first profiles 130A and 132A each specify how often the printing device is to perform the spit-wipe-prime operations prior to, during, and/or subsequent to print job performance, a sequence of the operations to be performed, and/or the duration of each operation. The computing device selects the first black profile 130A if the average temperature 126 for the most recent specified length of time (e.g., three months) is greater than the temperature threshold regardless of the black fluidic usage 122 during this length of time. The computing device likewise selects the first color profile 132A if the temperature 126 for the most recent specified length of time is greater than the temperature threshold regardless of the combined color fluidic usage 124 during this length of time. The temperature threshold may be 28 degrees Celsius, for instance.

In the example of FIG. 1, if the average temperature 126 for the most recent three (or other number of) months is not greater than (e.g., less than) the temperature threshold (128), and if the combined color fluidic usage 124 is not greater than (e.g., less than) a color threshold (136), then the first color profile 132A is still selected and transmitted to the printing device (138). By comparison, if the combined color fluidic usage 124 for the most recent three (or other number of) months is greater than the color threshold (136), then a second color profile 132B is selected by the computing device and transmitted to the printing device (140). The second color profile 132B is different than the first color profile 132A, and may specify performance of less aggressive servicing maintenance operations for the color nozzles than the first color profile 132A due to the more frequent combined color usage of the printing device during relatively low temperatures in the most recent specified length of time.

Similarly, in the example of FIG. 1, if the average temperature 126 for the most recent three (or other number of) months is not greater than the temperature threshold (128), and if the black fluidic usage 122 is not greater than (e.g., less than) a black threshold (142), then the first black profile 130A is still selected and transmitted to the printing device (144). By comparison, if the black fluidic usage 122 for the most recent three (or other number of) months is greater than the black threshold (142), then a second black profile 130B is selected by the computing device and transmitted to the printing device (146). The second black profile 130B is different than the first black profile 130A, and may similarly specify performance of less aggressive servicing maintenance operations for the black nozzles than the first black profile 130A due to the more frequent black usage of the printing device during relatively low temperatures in the most recent specified length of time.

The computing device may transmit the selected black profile 130A or 130B to the printing device at the same time as the computing device transmits the selected profile 132A or 132B. The printing device, as noted, performs servicing maintenance of the black nozzles according to the received black profile 130A or 130B, and performs servicing maintenance of the color nozzles according to received color profile 132A or 132B. Therefore, the printing device may perform more aggressive servicing maintenance on the black nozzles than on the color nozzles if the black profile 130B and the color profile 132A are received. Similarly, the printing device may perform more aggressive servicing maintenance on the color nozzles than on the black nozzles if the black profile 130A and the color profile 132B are received.

The black profiles 130A and 130B, collectively referred to as the black profiles 130, and the color profiles 132A and 132B, collectively referred to as the color profiles 132, are preconstructed profiles. The computing device, in performing the process 100, therefore selects a black profile to transmit to the printing device from the preconstructed black profiles 130, and selects a color profile to transmit to the printing device from the preconstructed color profiles 132. The process 100 thus dictates that the computing device perform profile selection in a rule-based manner, in that the comparisons of parts 128, 136, and 142 constitute rules that the computing device applies to determine which black profile 130A or 130B to select and which color profile 132A or 132B to select.

Because the black profile and the color profile are not hardcoded into the printing device, they can change over time as the black fluidic usage 122, the combined color fluidic usage 124, and/or the average temperature 126 for the most recent specified length of time changes. Furthermore, the computing device may select and transmit different black and color profiles for different printing devices based on their individual black fluidic usage 122, combined color fluidic usage 124, and average temperature 126. The black and color profiles 130 and 132 can thus be more tailored to specific fluidic usage and temperature, as compare to in a case in which a single black profile and a single color profile are used regardless of actual fluidic usage and actual temperature.

Therefore, the process 100 can reduce fluidic waste, because fewer potentially unnecessary spit-wipe-prime operations (i.e., the performance of servicing maintenance on fluidic printhead nozzles when none are plugged) are likely to be performed due to the more tailored black and color profiles 130 and 132. Similarly, the process 100 can improve end user experience. For instance, a user of a printing device may be less likely to have to manually initiate servicing maintenance of nozzles, because the black and color profiles 130 and 132 selected for the printing device are more closely tailored to the actual fluidic usage and temperature of the printing device.

Figure 2:
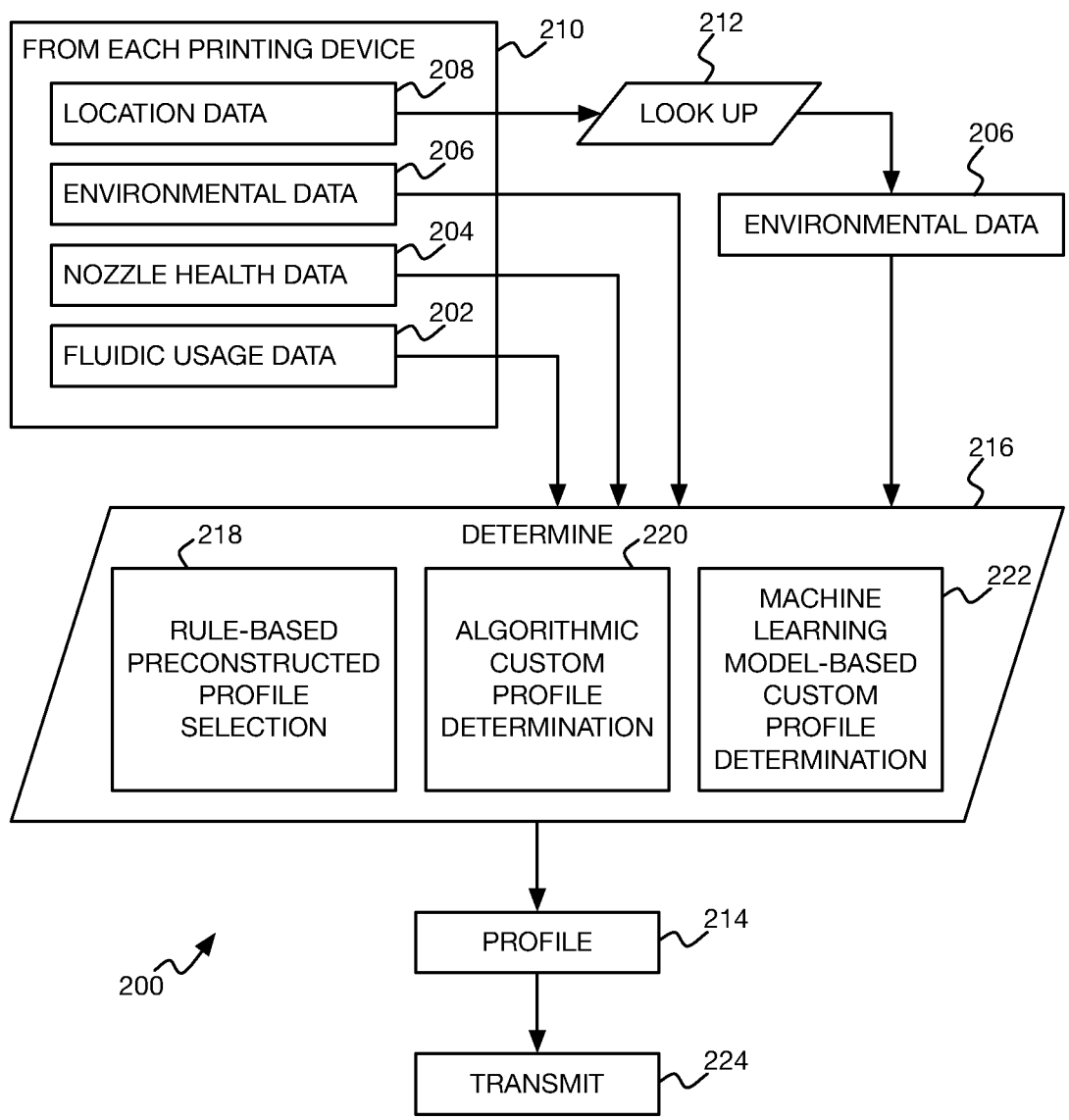
FIG. 2 is a diagram of an example process for determining a profile governing servicing maintenance of fluidic printhead nozzles of a printing device.

FIG. 2 shows an example process 200 for determining a profile governing servicing maintenance of fluidic printhead nozzles of a printing device. The process 200 is consistent with but more general than the process 100 of FIG. 1. Like the process 100, the process 200 is performed by a computing device that is communicatively connected to the printing device, such as over a network. The process 200 may similarly be implemented as program code stored on a non-transitory computer-readable data storage medium and executable by the computing device. The process 200 is described in relation to just one type of fluidic usage data, such as black fluidic usage or combined color fluidic usage.

The process 200 thus determines one profile, as opposed to selecting two profiles (one for black nozzles and one for color nozzles) as in the process 100.

The printing device in relation to which a profile governing servicing maintenance of fluidic printhead nozzles is determined in the process 200 is referred to as a selected printing device. Fluidic usage data 202, as well as nozzle health data 204, environmental data 206, and/or location data 208, can more generally be collected over time at each of a number of printing devices 210, including the selected printing device, and transmitted to the computing device. The process 200 may select a nozzle servicing maintenance profile for each printing device 210, however, and not just the selected printing device in relation to which the process 200 is described.

The fluidic usage data 202 received over time from each printing device 210 may be single color fluidic usage data or combined multiple color usage data. For instance, the fluidic usage data 202 may be the black usage data 102 or the combined color usage data 104 of FIG. 1. In an implementation in which the nozzle health data 204 is received over time from each printing device 210, the nozzle health data 204 may directly or indirectly nozzle health of the fluidic printhead nozzles of the printing device 210 in question. A nozzle that is unplugged and can eject fluid is healthier, for instance, than a nozzle that is plugged and therefore cannot eject fluid.

The nozzle health data 204 may provide a direct indication of nozzle health, either objectively or subjectively, as direct health data regarding the fluidic printhead nozzles. In both cases the printing device 210 may cause the nozzles to eject a nozzle health pattern image onto a sheet of media. As an objective measure of direct health data, the nozzle health data 204 may include an automatically or user-initiated optical scanning of the printed nozzle health pattern image. The computing device can thus compare the scanned nozzle health pattern image with an expected health pattern image to determine whether the nozzles correctly ejected fluid.

As a subjective measure of direct health data, the nozzle health data 204 may include user indication as to whether the printed nozzle health pattern image appears satisfactory. For example, the printing device 210 may instruct a user to compare the printed nozzle health pattern image with a displayed reference nozzle health pattern image, and assess whether the nozzles correctly ejected fluid. The nozzle health data 204 may instead provide an indirect indication of nozzle health. For example, the number of times the user manually initiated servicing maintenance of the fluidic printhead nozzles can correlate with nozzle health, since if the user is manually initiating spit-wipe-prime operations, this can mean that the nozzles are plugged and thus unhealthy.

In an implementation in which the environmental data 206 is received over time from each printing device 210, the environmental data 206 may include temperature, humidity, and/or altitude at which the printing device 210 is located, over time. For example, the environmental data 206 may include the temperature data 106 of FIG. 1. The environmental data 206 over time for a printing device 210 may not be received, however. In this case, location data 208 regarding the printing device 210 may instead be received. The location data 208 specifies the location of the printing device 210.

The computing device can then look up (212), or otherwise determine, the environmental data 206 for the printing device 210 over time based on the location data 208. For example, a third-party weather or other service may be consulted to determine the environmental data 206 for the location of the printing device 210. Therefore, in an implementation in which environmental data 206 is considered, the environmental data 206 over time for a printing device 210 may be received from the printing device 210 or may be determined based on the location data 208 received from the device 210.

A profile 214 is determined (216) for the selected printing device. The profile 214 is determined based on the fluidic usage data 202 over time received from the selected printing device, and may also be determined based on the fluidic usage data 202 over time received from each other printing device 210. The profile 214 may further be determined based on the nozzle health data 204 over time received from the selected printing device, and may also be determined based on the nozzle health data 204 over time received from each other printing device 210. The profile 214 may similarly also be determined based on the environmental data 206 regarding the selected printing device, and may also be determined based on the environmental data 206 regarding each other printing device 210.

The profile 214 governs servicing maintenance of the fluidic printhead nozzles of the selected printing device. The profile 214 may be a preconstructed profile that is selected using a rule-based preconstructed profile selection technique 218, such as the process 100 of FIG. 1. The rule-based preconstructed profile selection technique 218 applies rules against the fluidic usage data 202 of the selected printing device, and also in an implementation against the nozzle health data 204 and/or the environmental data 206 of the selected printing device, in order to select the profile 214 for the selected printing device from a number of preconstructed profiles. The rule-based preconstructed profile selection technique 218 may in an implementation similarly also apply rules against the fluidic usage data 202, the nozzle health data 204, and/or the environmental data 206 of one or multiple other printing devices 210 to select the profile 214 for the selected printing device from a number of preconstructed profiles.

The profile 214 may instead be a custom profile, and not a preconstructed profile, which is determined using an algorithmic custom profile determination technique 220. The algorithmic custom profile determination technique 220 performs an algorithm on the fluidic usage data 202 of the selected printing device, and also in an implementation on the nozzle health data 204 and/or the environmental data 206 of the selected printing device, in order to determine the profile 214 for the selected printing device. The algorithmic custom profile determination technique 220 may in an implementation similarly also perform the algorithm on the fluidic usage data 202, the nozzle health data 204, and/or the environmental data 206 of one or multiple other printing devices 210 to determine the profile 214 for the selected printing device.

The profile 214 may be a custom profile that is instead determined using a machine learning model-based custom profile determination technique 222. The machine learning model-based custom profile determination technique 222 inputs the fluidic usage data 202 of the selected printing device, and also in an implementation the nozzle health data 204 and/or the environmental data 206 of the selected printing device, into a machine learning model in order to determine the profile 214 for the selected printing device. The machine learning model-based custom profile determination technique 222 may in an implementation similarly also input into the machine learning model the fluidic usage data 202, the nozzle health data 204, and/or the environmental data 206 of one or multiple other printing devices 210 to determine the profile 214 for the selected printing device.

The usage of environmental data 206 of the selected printing device in addition to the fluidic usage data 202 of the selected printing device can result in determination of a profile 214 for the selected printing device that better reflects the servicing maintenance that should be performed on the printing device's nozzles to maintain nozzle health. For example, environmental data 206 indicating higher temperature, lower humidity, and/or higher altitude may result in a profile 214 specifying more aggressive servicing maintenance for the same fluidic usage data 202 than environmental data 206 indicating lower temperature, higher humidity, and/or lower altitude. The user is therefore less likely to experience impaired print quality when printing print jobs and/or is less likely to have to manually initiate servicing maintenance of the nozzles.

Similarly, the usage of nozzle health data 206 of the selected printing device in addition to the fluidic usage data 202 of the selected printing device can result in determination of a profile 214 for the selected printing device that better reflects the servicing maintenance that should be performed on the printing device's nozzles to maintain nozzle health. For example, if the nozzle health data 206 indicates impaired nozzle health, then a more aggressive profile 214 may be determined as compared to if the nozzle health data 206 does not indicate impaired nozzle health. The user is therefore again less likely to experience impaired print quality when printing print jobs and/or is less likely to have to manually initiate servicing maintenance of the nozzles.

The usage of fluidic usage data 202, nozzle health data 204, and/or environmental health data 206 of other printing devices 210 can also result in determination of a profile 214 for the selected printing device that better reflects the servicing maintenance that should be performed on the printing device's nozzles to maintain nozzle health. In the case in which a machine learning model-based custom profile determination technique is employed, for instance, the machine learning model can consider such data 202, 204, and 206 from a large number of printing devices 210 to determine the custom profile 214 for each individual printing device 210 (including the selected printing device). The user of the selected printing device is again less likely to experience impaired print quality when printing print jobs and/or is less likely to have to manually initiate servicing maintenance of the nozzles.

Once the preconstructed or custom profile 214 for the selected printing device has been determined (216), the computing device transmits (224) the determined profile 214 to the selected printing device. Upon receipt, the selected printing device performs spit-wipe-prime operations on its fluidic printhead nozzles according to the received profile 214. The process 200 can be periodically repeated, so as the fluidic usage data 202, nozzle health data 204, and/or environmental data 206 of the selected printing device changes, the profile 214 is updated to ensure that it continually reflects the servicing maintenance that should be performed on the printing device's nozzles to maintain nozzle health.

Figure 3:
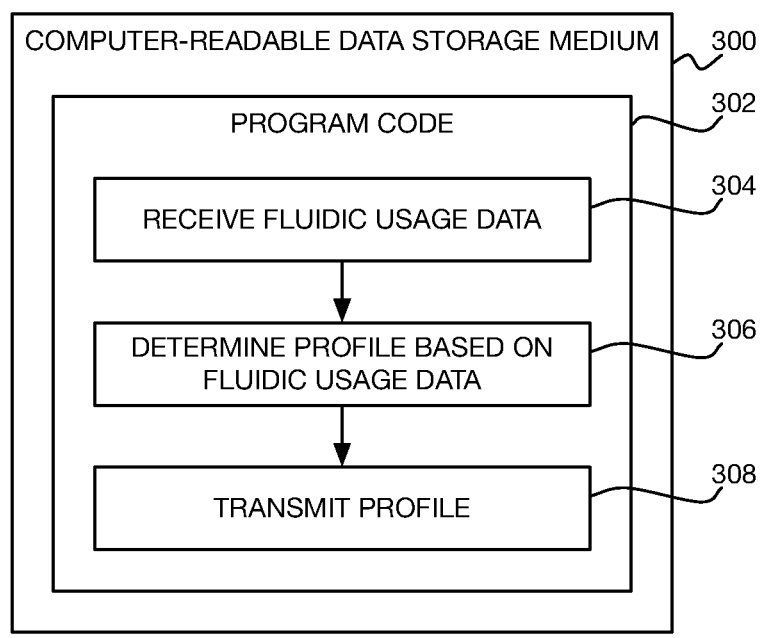
FIG. 3 is a diagram of an example non-transitory computer-readable data storage medium.

FIG. 3 shows an example non-transitory computer-readable data storage medium 300 storing program code 302 executable by a processor to perform processing. The processor may be part of a computing device that is communicatively connected to a printing device. The processing includes receiving fluidic usage data over time from the printing device (304), and determining a profile governing servicing maintenance of fluidic printhead nozzles of the printing device, based on the received fluidic usage data over time (306). The processing includes transmitting the profile to the printing device (308). The printing device thus performs spit-wipe-prime operations on the fluidic printhead nozzles according to the profile.

Figure 4:
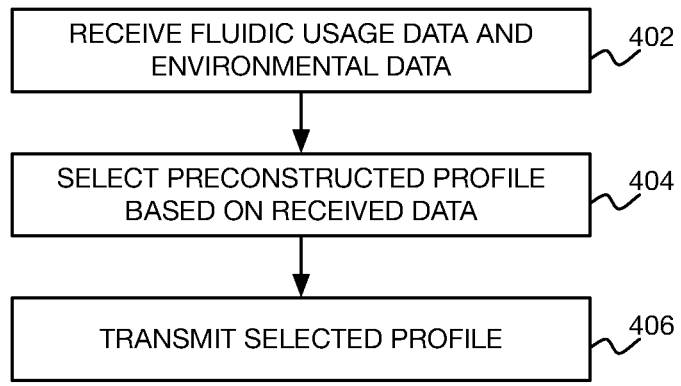
FIG. 4 is a flowchart of an example method.

FIG. 4 shows an example method 400. The method 400 may be performed by a computing device that is communicatively connected to a printing device. The method 400 includes receiving, from the printing device, fluidic usage data and environmental data over time (402). The method 400 includes selecting a profile governing servicing maintenance of fluidic printhead nozzles of the printing device from a plurality of a preconstructed profiles, based on the received fluidic usage data and environmental data over time (404). The method 400 includes transmitting the profile to the printing device (406), with the printing device performing spit-wipe-prime operations on the fluidic printhead nozzles according to the profile.

Figure 5:
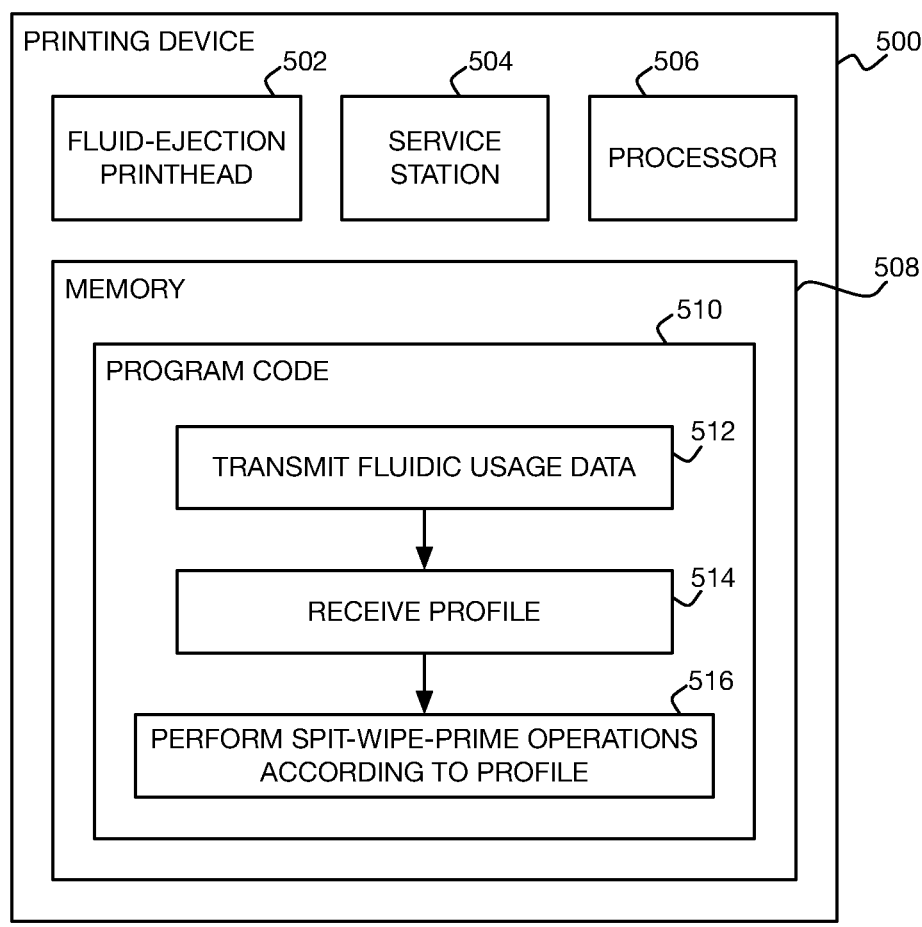
FIG. 5 is a diagram of an example printing device.

FIG. 5 shows an example printing device. The printing device 500 includes a fluid-ejection printhead 502 having fluidic printhead nozzles. The printing device 500 includes a service station 504 to which the fluid-ejection printhead is moved to perform spit-wipe-prime operations to maintain and service the fluidic printhead nozzles. The printing device 500 includes a processor 506, and a memory 508 storing program code 510. The program code 510 is executable by the processor 506 to transmit fluidic usage data regarding the fluid-ejection printhead 502 to a computing device (512). The program code 510 is executable by the processor 506 to receive from the computing device a profile governing servicing maintenance of the fluidic printhead nozzles determined based on the fluidic usage data (514). The program code 510 is executable by the processor 506 to perform the spit-wipe-prime operations according to the profile (516).

Techniques have been described herein for determining a profile governing servicing maintenance of fluidic printhead nozzles of a printing device. Periodically determining such a profile, instead of hardcoding it into the printing device at time of manufacture, permits the profile to better reflect the actual usage, environment, and conditions of the printing device. Therefore, nozzle servicing maintenance that the printing device performs in accordance with the profile is less likely to waste fluid and time in maintaining nozzle health, and is more likely to maintain nozzle health without manual user-initiated servicing maintenance of the nozzles.

We claim:

1. A non-transitory computer-readable data storage medium storing program code executable by a processor to perform processing comprising:
   receiving fluidic usage data over time from a printing device;
   determining a profile governing servicing maintenance of fluidic printhead nozzles of the printing device, based on the received fluidic usage data over time; and
   transmitting the profile to the printing device, the printing device performing spit-wipe-prime operations on the fluidic printhead nozzles according to the profile.

2. The non-transitory computer-readable data storage medium of claim 1, wherein the profile specifies how often to perform the spit-wipe-prime operations prior to, during, and/or subsequent to print job performance, a sequence of the spit-wipe-prime operations to be performed, and/or a duration of each spit-wipe-prime operation.

3. The non-transitory computer-readable data storage medium of claim 1, wherein determining the profile comprises:
selecting the profile from a plurality of preconstructed profiles in a rule-based manner, based on the received fluidic usage data over time.

4. The non-transitory computer-readable data storage medium of claim 3, wherein the preconstructed profiles comprise:
a first profile corresponding to single color fluidic usage over a most recent specified length of time less than a threshold; and
a second profile corresponding to the single color fluidic usage over the most recent specified length of time greater than the threshold.

5. The non-transitory computer-readable data storage medium of claim 3, wherein the preconstructed profiles comprise:
a first profile corresponding to combined multiple color fluidic usage over a most recent specified length of time less than a threshold; and
a second profile corresponding to the combined multiple color fluidic usage over the most recent specified length of time greater than the threshold.

6. The non-transitory computer-readable data storage medium of claim 1, wherein determining the profile comprises:
algorithmically determining a custom profile for the printing device, based on the received fluidic usage data over time; or
determining a custom profile for the printing device using a machine learning model, based on the received fluidic usage data over time.

7. The non-transitory computer-readable data storage medium of claim 1, wherein the processing further comprises:
receiving from the printing device environmental data regarding an environment of the printing device, the environmental data comprising temperature, humidity, and/or altitude at which the printing device is located, over time,
wherein the profile is further determined based on the received environmental data.

8. The non-transitory computer-readable data storage medium of claim 1, wherein the processing further comprises:
receiving from the printing device location data regarding the printing device; and
determining environmental data regarding an environment of the printing device, based on the received location data, the environmental data comprising temperature, humidity, and/or altitude at which the printing device is located, over time.

9. The non-transitory computer-readable data storage medium of claim 1, wherein the processing further comprises:
receiving from the printing device health data regarding the fluidic printhead nozzles,
wherein the profile is further determined based on the received health data regarding the fluidic printhead nozzles.

10. The non-transitory computer-readable data storage medium of claim 9, wherein the health data regarding the fluidic printhead nozzles comprises one or both of:
a number of times the servicing maintenance of the fluidic printhead nozzles was manually initiated at the printing device, as indirect health data regarding the fluidic printhead nozzles;
indications of actual fluidic printhead nozzle health resulting from nozzle health pattern images printed by the printing device, as direct health data regarding the fluidic printhead nozzles.

11. The non-transitory computer-readable data storage medium of claim 1, wherein the printing device is a selected printing device of a plurality of printing devices, the processing further comprising:
receiving the fluidic usage data over time from each printing device,
wherein the profile governing the servicing maintenance of the fluidic printhead nozzles of the selected printing device is further determined based on the fluidic usage data over time received from each printing device.

12. A method comprising:
receiving, from a printing device, fluidic usage data and environmental data over time;
selecting a profile governing servicing maintenance of fluidic printhead nozzles of the printing device from a plurality of a preconstructed profiles, based on the received fluidic usage data and environmental data over time; and
transmitting the profile to the printing device, the printing device performing spit-wipe-prime operations on the fluidic printhead nozzles according to the profile.

13. The method of claim 12, wherein the environmental data comprises temperature data, and the preconstructed profiles comprise:
a first profile corresponding to average temperature over a most recent specified length of time less than a temperature threshold and single color fluidic usage over the most recent specified length of time less than a usage threshold, and corresponding to the average temperature over the most recent specified length of time greater than the temperature threshold regardless of the single color fluidic usage over the most recent specified length of time; and
a second profile corresponding to the average temperature over the most recent specified length of time less than the temperature threshold and the single color fluidic usage over the most recent specified length of time greater than the usage threshold.

14. The method of claim 12, wherein the preconstructed profiles comprise:
a first profile corresponding to average temperature over a most recent specified length of time less than a temperature threshold and combined multiple color fluidic usage over the most recent specified length of time less than a usage threshold, and corresponding to the average temperature over the most recent specified length of time greater than the temperature threshold regardless of the combined multiple color fluidic usage over the most recent specified length of time; and
a second profile corresponding to the average temperature over the most recent specified length of time less than the temperature threshold and the combined multiple color fluidic usage over the most recent specified length of time greater than the usage threshold.

15. A printing device comprising:
a fluid-ejection printhead having fluidic printhead nozzles;

a service station to which the fluid-ejection printhead is moved to perform spit-wipe-prime operations to maintain and service the fluidic printhead nozzles;

a processor; and a memory storing program code executable by the processor to:

transmit fluidic usage data regarding the fluid-ejection printhead to a computing device;

receive from the computing device a profile governing servicing maintenance of the fluidic printhead nozzles determined based on the fluidic usage data; and perform the spit-wipe-prime operations according to the profile.

\* \* \* \* \*